United States Patent
Park et al.

(10) Patent No.: US 8,583,150 B2
(45) Date of Patent: Nov. 12, 2013

(54) PERSONALIZED CHANNEL SERVICE PROVIDING SYSTEM, REAL-TIME CHANNEL SERVICE PROVIDING METHOD, AND PERSONALIZED CHANNEL SERVICE PROVIDING SYSTEM METHOD

(75) Inventors: Yun Kyung Park, Daejeon (KR); Jeun Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 74 days.

(21) Appl. No.: 13/288,528

(22) Filed: Nov. 3, 2011

(65) Prior Publication Data
US 2012/0149406 A1    Jun. 14, 2012

(30) Foreign Application Priority Data
Dec. 10, 2010    (KR) .................. 10-2010-0126405

(51) Int. Cl.
*H04W 4/12*    (2009.01)
(52) U.S. Cl.
USPC .......................................... 455/466; 370/428

(58) Field of Classification Search
USPC ............ 455/414.3, 422.1, 466, 509; 370/216, 370/428
See application file for complete search history.

(56) References Cited

U.S. PATENT DOCUMENTS

2009/0013387 A1 *    1/2009    Paas et al. .................... 726/5

FOREIGN PATENT DOCUMENTS

WO    2008/119175 A1    10/2008

* cited by examiner

*Primary Examiner* — Sam Bhattacharya
(74) *Attorney, Agent, or Firm* — Ladas & Parry LLP

(57) ABSTRACT

The present invention relates to a technology of maintaining and managing a contents push channel using a smart phone, and more particularly, to a personalized channel service providing system, real-time channel service providing method, and a personalized channel service providing method capable of maintaining and managing a personalized contents channel using a portable smart phone and timely using personalized contents by pushing to devices having a large display such as TV, etc., if necessary.

11 Claims, 3 Drawing Sheets

PERSONALIZED CHANNEL SERVICE PROVIDING SYSTEM, REAL-TIME CHANNEL SERVICE PROVIDING METHOD, AND PERSONALIZED CHANNEL SERVICE PROVIDING SYSTEM METHOD

CROSS-REFERENCE TO RELATED APPLICATIONS

This application claims priority to and the benefit of Korean Patent Application No. 10-2010-0126405 filed in the Korean Intellectual Property Office on Dec. 10, 2010, the entire contents of which are incorporated herein by reference.

TECHNICAL FIELD

The present invention relates to a technology of maintaining and managing a contents push channel using a smart phone, and more particularly, to a personalized channel service providing system, a real-time channel service providing method, and a personalized channel service providing method capable of maintaining and managing a personalized contents channel using a portable smart phone and timely using personalized contents by pushing information to devices having a large display such as TV, etc., if necessary.

BACKGROUND

Recently, the use of a cloud computing technology has been suddenly propagated. As a result, various methods to use the same services in various types of terminals have been attempted. To this end, a method to standardize platforms for all terminals and a method to provide all services using a web have been attempted.

The cloud computing technology enables a user to use his/her ower information at any time, anywhere and performs a system management, such that it offers convenencice for a user. However, the cloud computing technology has the following problems: presence of various platforms, difficulty in maintaining personal privacy due to data storage on a network, difficulty in persoanalizing common devices such as TV, etc., inefficiency in the use of storage device due to data duplication storage in a network and a terminal, and a scarcity of common network resources due to a sudden increase of information access using a network, etc.

SUMMARY

The present invention has been made in an effort to provide a personalized channel service providing system, a real-time channel service providing method, and a personalized channel service providing method capable of managing a personalized contents channel using a smart phone and using personalized contents by pushing necessary information to other devices (for example, display devices such as TV) if necessary.

An exemplary embodiment of the present invention provides a personalized channel service proving system configured to a mobile communication device and a display device, wherein the mobile communication device includes a message analyzer determining whether a message includes moving picture link information when the message is pushed; a moving picture channel storing the moving picture link information included in the message; a real-time message conversion module converting the message into a text data; and a channel data transceiver transmitting the moving picture link information stored in the moving picture channel or the text message to the display device, and the display device includes a channel data transceiver receiving the moving picture link information or the text data from the mobile communication device; a data analyzer analyzing whether the message is the moving picture link information or the text data; a moving picture channel storing the moving picture link information; a real-time message processor to display the text message on the screen; and a moving picture player playing sequentially playing the moving picture on the screen using the moving picture link information stored the moving picture channel.

Another exemplary embodiment of the present invention provides a real-time channel service providing method using a system configured to include a mobile communication device and a display device, the method including: a) analyzing pushed message by the mobile communication device to determine whether the pushed message includes the moving image link; (b) if so, storing the moving picture link information in the moving picture channel by the mobile communication device; (c) converting the message into a text data when whether to provide the real-time channel service is set as "on", by the mobile communication device; (d) transmitting the moving image link information or the converted text data stored in the moving picture channel to the display device from the mobile communication device; and (e) playing the corresponding moving picture on the screen when receiving the moving picture link information from the mobile communication device and displaying the corresponding text on the screen through an overlay function when receiving a text data, by the display device.

Yet exemplary embodiment of the present invention provides a personalized channel service providing method using a system configured to include a mobile communication device and a display device, the method including: (a) starting a moving picture link transmission service by the mobile communication device; (b) transmitting moving picture link information stored in the moving picture channel to a display device from the mobile communication device; (c) receiving the moving picture link information from the mobile communication device and storing the received moving picture link information in the a moving picture channel by the display device and initializing a moving picture link count, by the display device; (d) playing the corresponding moving picure on the screen using the received moving picture link information and performing a process of increasing the moving picture link count by "1" after deleting the corresponding moving picture link information from the moving picture channel until the moving picture link transmission service stops, by the display device; (e) transmitting the moving picture link count to the mobile communication device from the display device; and (f) deleting the moving picture link information played in the display device from the moving picture channel by referring to the moving picture link count received from the display device by the mobile communication device.

According to the exemplary embodiments of the present invention, it can solve the problems of the separate service development due to the presence of various platforms, the difficulty in maintaining the personal privacy due to the data storage on the network, the difficulty in personalizing the common devices, the inefficiency in the use of the storage device due to the data duplication storage in the network and the terminal, the scarcity of common network resources due to the sudden increase of information access using the network, etc.

DETAILED DESCRIPTION

Figure 1:
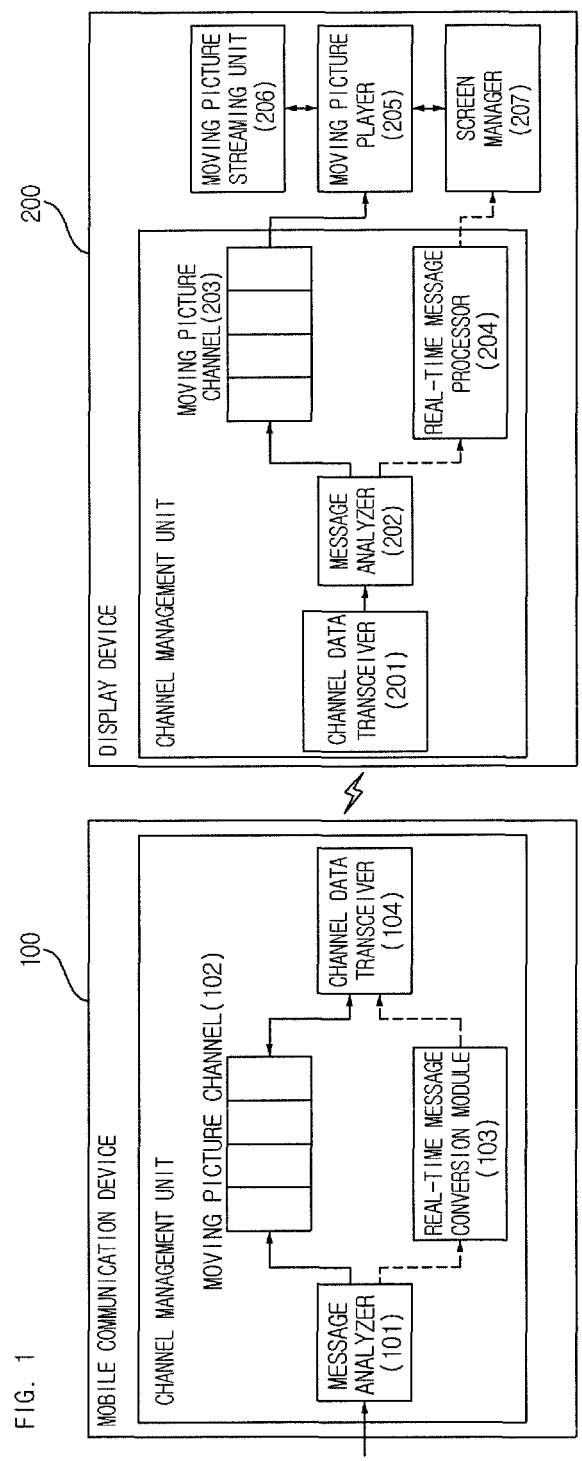
FIG. 1 is a block diagram showing a configuration of a personalized channel service providing system according to an exemplary embodiment of the present invention.

Hereinafter, exemplary embodiments of the present invention will be described in detail with reference to the accompanying drawings. In this description, when any one element is connected to another element, the corresponding element may be connected directly to another element or with a third element interposed therebetween. First of all, it is to be noted that in giving reference numerals to elements of each drawing, like reference numerals refer to like elements even though like elements are shown in different drawings. The components and operations of the present invention illustrated in the drawings and described with reference to the drawings are described as at least one exemplary embodiment and the spirit and the core components and operation of the present invention are not limited thereto.

Exemplary embodiments of the present invention may be implemented through various units. For example, the exemplary embodiments of the present invention may be implemented by hardware, firmware, software, a combination thereof, or the like.

In case of the implementation by the hardware, a method according to the exemplary embodiments of the present invention may be implemented by one or more application specific integrated circuits (ASICs), digital signal processors (DPSs), digital signal processing devices (DSPDs), programmable logic devices (PLDs), field programmable gate arrays (FPGAs), processors, controllers, microcontrollers, microprocessors, or the like.

In case of the implementation by the firmware or the software, the method according to the exemplary embodiment of the present invention may be implemented by a type such as a module, a procedure, or a function, or the like, which performs the above-mentioned functions or operations. A software code may be stored in a memory unit and may be driven by a processor. The memory unit is disposed inside or outside the processor to transmit and receive data to and from the processor by various units that have been already known.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Further, a term, "module", described in the specification implies a unit of processing at least one function or operation and can be implemented by hardware or software or a combination of hardware and software.

In the following description, specific terms are provided in order to assist the understanding of the present invention and the use of these specific terms may be changed in other types in the scope without departing from the technical idea of the present invention.

Hereinafter, a personalized channel service providing system, a real-time channel service providing method, and a personalized channel service providing method will be described with reference to the accompanying drawings.

First, a personalized channel service providing system according to the exemplary embodiment of the present invention will be described with reference to FIG. 1. Referring to FIG. 1, a personalized channel service providing system according to an exemplary embodiment of the present invention is configured to include a mobile communication device 100 (for example, smart phone) and a display device 200 (for example, IPTV). The mobile communication device 100 receives various cloud services from a common cloud and the display device 200 receives personalized services provided by the mobile communication device 100.

The mobile communication device 100 is configured to include a message analyzer 101, a moving picture channel 102, a real-time message conversion module 103, and a channel data transceiver 104.

The message analyzer 101 determines whether a message includes moving picture link information, when the message is pushed.

The moving picture channel 102 stores and manages the moving picture link information included in the message if the message analyzer 10 is determined that the moving picture link information is present in the message.

The real-time message conversion module 103 converts the message into a text data.

The channel data transceiver 104 transmits the moving picture link information or the text message stored in the moving picture channel 102 to the display device 200.

The display device 200 is configured to include a channel data transceiver 201, a data analyzer 202, a moving picture channel 203, a real-time message processor 204, a moving picture player 205, a moving picture streaming unit 206, and a screen manager 207.

The channel data transceiver 201 receives the moving picture link information or the text data from the mobile communication device 100.

The data analyzer 202 analyzes whether the data received by the channel data transceiver 201 is the moving picture link information or the text data.

The moving picture channel 203 stores and manages the moving picture link information when the data analyzer 202 analyzes the received data as the moving picture link information.

The real-time message processor 204 transmits the text message to the screen manager 207 to be displayed on the screen.

The moving picture image player 205 uses the moving picture link information stored in the moving picture channel 203 to sequentially play the moving pictures. In this case, the moving picture player 205 uses moving picture streaming services of the moving picture streaming unit 206 when the moving pictures are played.

A personalized channel service providing system according to the exemplary embodiment of the present invention, including the mobile communication device 100 and the display device 200 having the above-mentioned configuration, will be described in more detail below.

The mobile communication device 100 generates the real-time information providing channel when being connected with the display device 200 and converts the pushed message into the text data and transmits the text data to the display device 200 through the real-time information providing channel in real time, the display device 200 displays the received text data on the screen by using an overlay function, and the real-time information providing channel is deactivated when the interconnection is released. In this case, the data transmitted to the display device 200 through the real-time information providing channel is transmitted but does not have an effect on the data of the mobile communication device 100.

When the user manually drives the push while he/she using the mobile communication device 100 plays the moving picture, the mobile communication device 100 extracts the link information of the moving picture that is being played and the current playing time information to generate the message and transmits the generated message to the display device 200 through the real-time information providing channel in real time and the display device 200 uses the information included in the received message to play the corresponding moving picture on the screen from the position where the play stops.

Further, the mobile communication device 100 extracts the moving picture link information from various messages pushed while being not connected with the display device 200 and stores and manages the extracted moving picture link information in the personalized moving picture channel, separately from the above-mentioned real-time information providing channel. That is, the mobile communication device 100 transmits the moving picture link information stored in the moving picture channel to the display device 200 when the moving picture channel service is driven, the display device 200 uses the received moving picture link information to play the corresponding moving picture on the screen and when the play is completed, deletes the moving picture link information from the moving picture channel 203 and uses other moving picture link information stored in the moving picture channel 203 to play the corresponding moving picture on the screen and when the play is completed, deletes the moving picture link information from the moving picture channel 203. Further, the display device 200 transmits the current moving picture channel information to the mobile communication device 100 when the user stops the moving picture channel service during the repetition process of the moving picture play/the moving picture deletion and the mobile communication device 100 deletes the moving picture link information played in the display device 200 from the moving picture channel 102 by using the channel information received from the display device 200.

Figure 2:
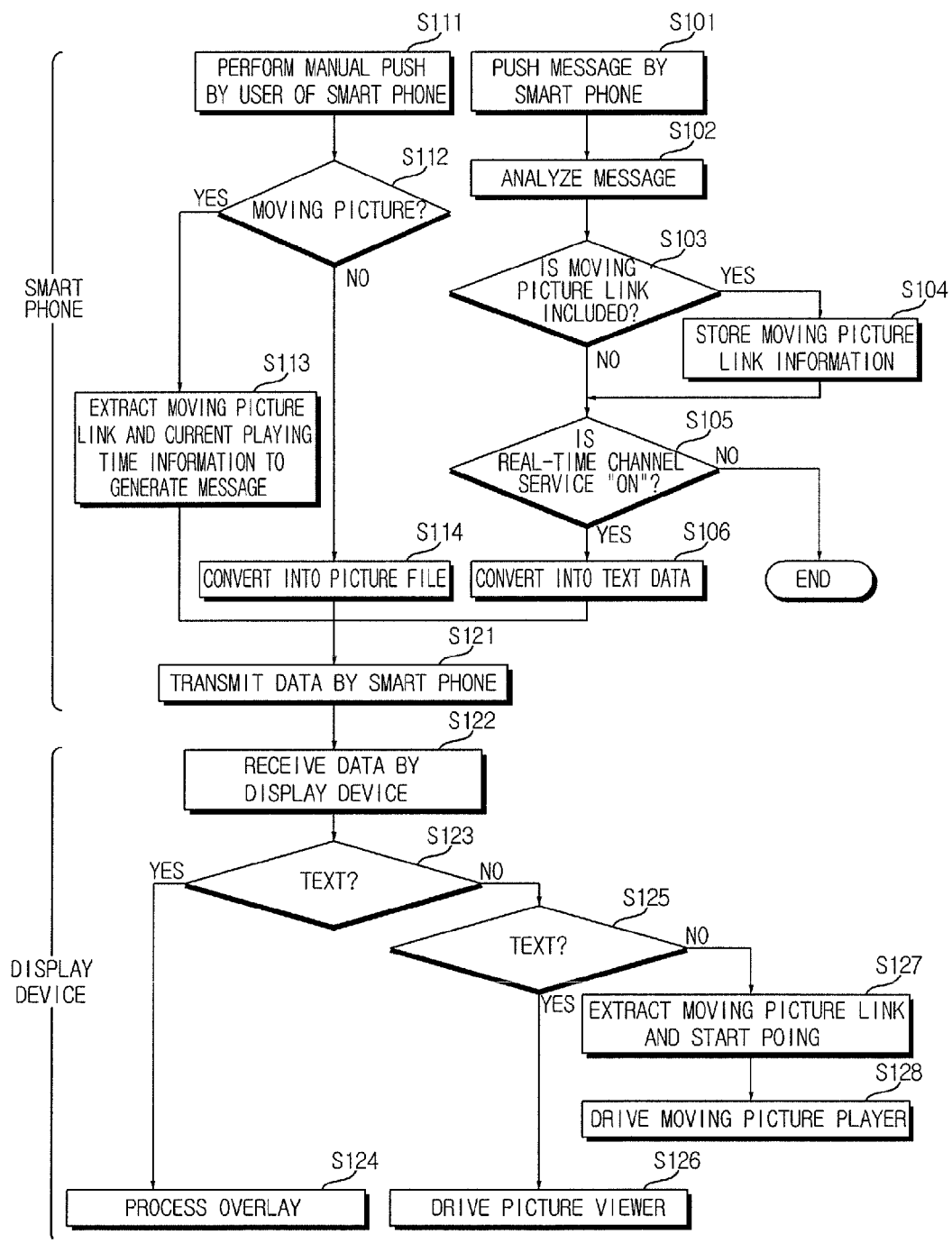
FIG. 2 is a flow chart showing a real-time channel service providing method according to an exemplary embodiment of the present invention.

Hereinafter, the real-time channel service providing method according to the exemplary embodiment of the present invention will be described below with reference to FIG. 2.

First, the mobile communication device 100 analyzes the message when the message is pushed to determine whether the message includes the moving picture link, and if so, the mobile communication device 100 stores the moving picture link information in the moving picture channel 102 and then, converts the message into the text data when whether to provide the real-time channel service is set as "on" (S101 to S106). On the other hand, when the user using the mobile communication device 100 manually drives the push, he/she determines whether the information to be manually pushed is the moving picture or not and if so, he/she extracts the moving picture link information that is being played and the current playing time information to generate the message and if not, he/she converts the screen that is being played into the picture file (S111 to S114).

Next, the mobile communication device 100 transmits the moving picture link information stored in the moving picture channel 102, the converted text data, the message the moving picture link information and the current playing time information, or the picture file to the display device 200 (S121).

Next, the display device 200 plays the corresponding moving picture on the screen by driving the streaming service when receiving the moving picture link information from the mobile communication device 100, displays the corresponding text on the screen using the overlay function when receiving the text data, uses the moving picture link information and the current playing time information that are included in the message when receiving the message including the moving picture link information and the current playing time information to play the corresponding moving picture by driving the streaming service from the position where the play stops, and displays the corresponding picture on the screen by driving a picture viewer when receiving the picture file (S122 to S128).

Figure 3:
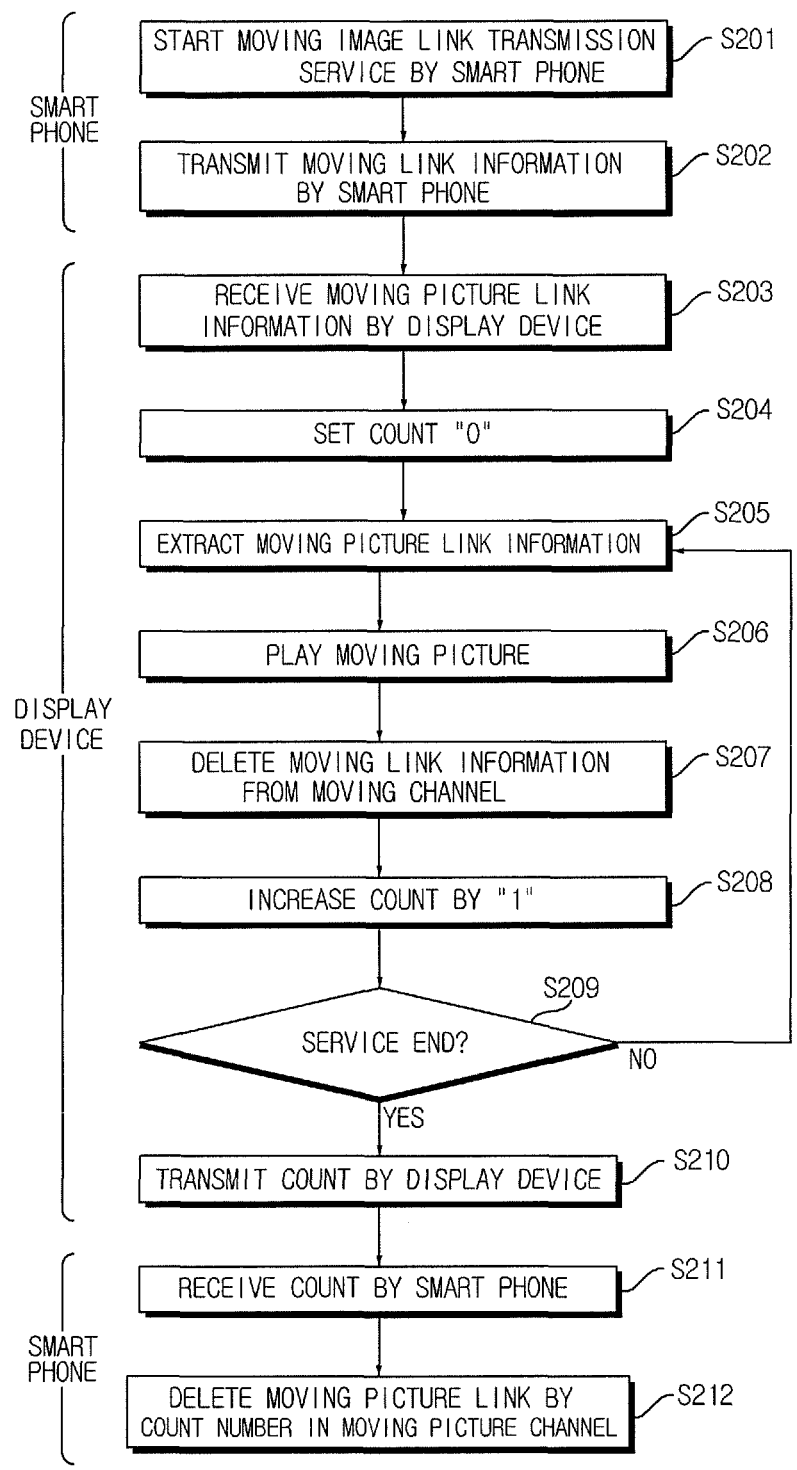
FIG. 3 is a flow chart showing another personalized channel service providing method according to an exemplary embodiment of the present invention.

Hereinafter, the personalized channel service providing method according to the exemplary embodiment of the present invention will be described below with reference to FIG. 3.

First, the mobile communication device 100 starts the moving picture link transmission service (S201).

Next, the mobile communication device 100 transmits the moving picture link information stored in the moving picture channel 102 to the display device 200.

Next, the display device 200 receives the moving picture link information from the mobile communication device 100, stores the received moving picture link information in the moving picture channel 203, and initializes the moving picture link count.

Next, the display device 200 plays the corresponding moving picture on the screen by driving the streaming service using the received moving picture link information and deletes the corresponding moving picture link information from the moving picture channel 203 and then, performs a process of increasing the moving picture link count by "1" until the moving picture link transmission service stops.

Next, the display device 200 transmits the moving picture link count to the mobile communication device 100. Next, the mobile communication device 100 deletes the moving picture link information played in the display device 200 from the moving picture channel 102 by referring to the moving picture link count received from the display device 200.

As described above, the exemplary embodiments have been described and illustrated in the drawings and the specification. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. A personalized channel service proving system, the system comprising:
the personalized channel service proving system configured to a mobile communication device and a display device,
wherein the mobile communication device comprises a message analyzer determining whether a message comprises moving picture link information when the message is pushed;
a moving picture channel storing the moving picture link information comprised in the message;
a real-time message conversion module converting the message into a text data;
a channel data transceiver transmitting at least one of the moving picture link information stored in the moving picture channel and the text message to the display device, and the display device comprises a channel data transceiver receiving at least one of the moving picture link information and the text data from the mobile communication device;

a data analyzer analyzing whether the message is the moving picture link information or the text data;

a moving picture channel storing the moving picture link information;

a real-time message processor to display the text message on a screen; and a moving picture player playing sequentially playing a moving picture on the screen using the moving picture link information stored the moving picture channel, wherein the display device is a separate device from the mobile communication device, and wherein after the moving picture link information has been stored in the moving picture channel and after the moving picture link information has been transmitted from the mobile communication device to the display device then a streaming service can be set up for streaming the moving picture directly to the display device.

2. The personalized channel service proving system of claim 1, wherein the mobile communication device generates a real-time information providing channel when connecting with the display device to transmit the text data to the display device through the real-time information providing channel in real time, and wherein the display device receiving the text data from the mobile communication device displays the text data on the screen using an overlay function.

3. The personalized channel service proving system of claim 1, wherein when a user using the mobile communication device manually drives the push during playing the moving picture, the mobile communication device extracts the moving picture link information and a current playing time information that are being played to generate a message and transmits the generated message to the display device, and the display device receiving the message from the mobile communication device plays the corresponding moving picture from a position where the playing stop by using information comprised in the device.

4. The personalized channel service proving system of claim 1, wherein the moving picture player of the display device uses the moving picture link information to play the corresponding moving picture on the screen by driving the streaming service.

5. The personalized channel service proving system of claim 1, wherein the mobile communication device extracts the moving picture link information from the pushed message while being not connected with the display device and stores the extracted moving picture link information in the moving picture channel, and the moving communication device transmits the moving picture link information stored in the moving picture channel to the display device when the moving picture channel service is driven and the display device receiving the moving picture link information from the mobile communication device uses the moving picture link information to play the corresponding moving picture on the screen and when the play is completed, repeats a process of deleting the moving picture link information from the moving picture channel and then, when the moving channel service stops, transmits a current moving picture channel information to the mobile communication device, and the mobile communication device receiving the channel information from the display device deletes the played moving picture link information from the display device.

6. A real-time channel service providing method, the method comprising:

the real-time channel service providing method using a system configured to comprise a mobile communication device and a display device, wherein the display device is a separate from the mobile communication device, (a) analyzing pushed message by the mobile communication device to determine whether the pushed message includes the moving image link;

(b) if so, storing the moving picture link information in the moving picture channel by the mobile communication device;

(c) converting the message into a text data when whether to provide the real-time channel service is set as "on", by the mobile communication device;

(d) transmitting at least one of the moving image link information and the converted text data stored in the moving picture channel to the display device from the mobile communication device, and wherein after the moving picture link information has been stored in the moving picture channel and after the moving picture link information has been transmitted from the mobile communication device to the display device then a streaming service can be set up for streaming the moving picture directly to the display device; and (e) playing a corresponding moving picture on a screen of the display device when receiving the moving picture link information from the mobile communication device and displaying the corresponding text on the screen through an overlay function when receiving a text data, by the display device.

7. The method of claim 6, further comprising, in prior to step (d), (f) extracting the moving picture link informatjona and the current playing time information that are being played, by the mobile communication device, to generate the message, when the user using the mobile communication device manually drives the push, wherein at step (d), the mobile communication device transmits the message comprising the moving picture link information and the current playing time information to the display device and at step (e), plays the corresponding moving picture on the screen from a position where the play stops by using the moving picture link information and the current playing time information that are comprised in the message.

8. The method of claim 7, wherein step (f) comprises:

(f1) performing a manual push by the user using the mobile communication device;

(f2) determining by the mobile communication device whether the information manually pushed by the user is a moving picture or not; and (f3) if so, extracting the moving picture link information and the current playing time information to generate the message, and wherein after the moving picture link information has been stored in the moving picture channel and after the moving picture link information has been transmitted from the mobile communication device to the display device then a streaming service can be set up for streaming the moving picture directly to the display device, and if not, converting the screen that is being played into a picture file, by the mobile communication device, at step (d), the mobile communication device transmitting the message comprising the moving picture link information and the current playing time information to the display device or transmitting the picture file to the display device and at step (e), the display device playing the corresponding moving picture on the screen when receiving the moving picture link information from the mobile communication device and displaying the picture file on the screen through a picture viewer when receiving the picture file.

9. The method of claim 6, wherein at step (e), the display device uses the moving picture link information when receiving the moving picture link information from the mobile communication device to play the corresponding moving picture on the screen by driving the streaming service.

10. A personalized channel service providing method using a system configured to comprise a mobile communication device and a display device, the method comprising:
   (a) starting a moving picture link transmission service by the mobile communication device;
   (b) transmitting moving picture link information stored in the moving picture channel to a display device from the mobile communication device;
   (c) after the transmitted moving picture link information by the mobile communication device to the display device, then the display device receives the moving picture link information from the mobile communication device and stores the received moving picture link information in the a moving picture channel and initializes a moving picture link count, and
   wherein after the moving picture link information has been stored in the moving picture channel and after the moving picture link information has been transmitted from the mobile communication device to the display device then a streaming service can be set up for streaming the moving picture directly to the display device;
   (d) playing the corresponding moving picture on the screen using the received moving picture link information and performing a process of increasing the moving picture link count by "1" after deleting the corresponding moving picture link information from the moving picture channel until the moving picture link transmission service stops, which is done by the display device;
   (e) transmitting the moving picture link count to the mobile communication device from the display device; and
   (f) deleting the moving picture link information played in the display device from the moving picture channel by referring to the moving picture link count received from the display device, by the mobile communication device.

11. The method of claim 10, wherein at step (d), the display device use the received moving picture link information to play the corresponding moving picture on the screen by driving the streaming service.

* * * * *